United States Patent [19]

Müller

[11] 4,349,515

[45] Sep. 14, 1982

[54] TUNGSTEN PRODUCTION FROM RAW MATERIALS CONTAINING PHOSPHORUS IMPURITIES

[75] Inventor: Wolfgang Müller, Bad Harzburg, Fed. Rep. of Germany

[73] Assignee: Hermann C. Starck Berlin, Berlin, Fed. Rep. of Germany

[21] Appl. No.: 267,839

[22] Filed: May 28, 1981

[30] Foreign Application Priority Data

Jun. 24, 1980 [DE] Fed. Rep. of Germany ....... 3023593

[51] Int. Cl.$^3$ .............................................. C01G 41/00
[52] U.S. Cl. ......................................... 423/58; 423/61
[58] Field of Search ............................ 423/58, 61, 593

[56] References Cited

U.S. PATENT DOCUMENTS

| | | | |
|---|---|---|---|
| 1,388,857 | 8/1921 | Giles et al. | 423/58 |
| 1,399,705 | 12/1921 | Ekeley et al. | 423/58 |
| 2,388,306 | 6/1945 | Burwell | 423/593 |
| 2,394,362 | 2/1946 | Burwell | 423/58 |
| 2,893,832 | 7/1959 | Lowng | 423/58 |
| 2,894,814 | 7/1959 | Lowng | 423/58 |
| 4,273,745 | 6/1981 | Laferty | 423/58 |

*Primary Examiner*—Herbert T. Carter
*Attorney, Agent, or Firm*—Ladas & Parry

[57] ABSTRACT

A method for producing tungsten compounds low in phophorus. Calcium tungstate is precipitated from a tungstate solution possibly containing phosphate with a calcium compound. The resulting precipitate is reacted with an alkali carbonate solution under pressure of preferably 15 to 25 bar and the solution resulting is separated from the residue containing substantially all of the phosphate. The resulting solution is collected and is suitable for production of tungsten compositions low in phosphorus.

10 Claims, No Drawings

TUNGSTEN PRODUCTION FROM RAW MATERIALS CONTAINING PHOSPHORUS IMPURITIES

DESCRIPTION

1. Field of the Invention

The invention relates to a method for producing very pure tungsten compounds from tungstate solutions and in particular alkali tungstate solutions contaminated with phosphate.

2. Brief Description of the Background of the Invention Including Prior Art

For most applications of tungsten compounds it is undesirable to have phosphorus present in amounts of more than 0.005 weight percent. On the other hand, the phosphorus contained in the raw materials passes at least in part into the tungstate solutions produced as an intermediate product in the decomposition processes conventionally employed in industry.

For removal of these impurities magnesium compounds are usually added, which precipitate the phosphate (Journal "Erzmetall", Vol. 31, (1978), pages 395–396). This process provides for various disadvantages:

If the magnesium compound is added to ammonium tungstate solutions, then the presence of an excess of magnesium has to be avoided since this excess results in a contamination with magnesium of the ammonium paratungstate to be prepared. Therefore, an expensive and time-consuming analytical supervision is required.

In contrast, when treating sodium tungstate solutions a large excess of magnesium compounds has to be added for the complete removal of the phosphate. The magnesium phosphate precipitate does not filter well and for practical purposes cannot be washed free of tungsten. This causes either losses or requires a reworking of the magnesium phosphate slurries. For these reasons this process can only be employed economically for the removal of small amounts of phosphorus in a tungstate solution.

It is also known that in the pressure leaching of tungsten ores with soda solution frequently part of the phosphate content remains in the residue left by the solution and thus a certain purifying effect occurs in the production of tungstate solution (Yih/Wang in the book "Tungsten", New York 1979, page 91).

This depletion is usually insufficient to produce sufficiently pure tungstate solutions such that a post purifying step is required of the kind described above. In addition this effect of course only can be employed in the processing of ores, but cannot be employed in the processing of other tungsten raw materials such as scrap or residues.

SUMMARY OF THE INVENTION

1. Purposes of the invention

It is an object of the present invention to provide for a separation of the phosphorus from the tungsten without the disadvantages of the conventional processes.

It is another object of the present invention to allow for economic processing of tungsten raw materials containing substantial amounts of phosphorus, which in accordance to the state of the art is presently not possible.

It is a further object of the present invention to avoid contaminating the tungsten to be purified with additional extrinsic reagent materials.

These and other objects and advantages of the present invention will become evident from the description which follows:

2. Brief Description of the Invention

The present invention provides a method for producing tungsten compounds low in phorphorus, which comprises precipitating calcium tungstate from a tungsten solution containing phosphate impurities and converting the calcium tungstate by a pressure leaching with alkali carbonate to produce a tungstate solution and a residue containing calcium phosphate and calcium carbonate.

The pressure leaching can be performed at a pressure above 3 bar and is preferably performed at a pressure from about 15 to 25 bar. Advantageously the alkali carbonate is employed in a larger amount than would correspond to a stochiometric ratio for the formation of alkali tungstate and preferably the amount of alkali carbonate employed is from about 2 to 3 times the amount corresponding to a stochiometric ratio.

Part of the alkali carbonate can be replaced by a corresponding amount of alkali hydroxide and preferably from about 5 to 10 weight percent of the alkali carbonate is replaced by alkali hydroxide. The concentration of the alkali carbonate solution employed in the reaction can have a concentration of less than about 30 weight percent. A preferred alkali carbonate is sodium carbonate.

The invention accordingly consists in the series of steps which will be exemplified in the method hereinafter described and of which the scope of application will be indicated in the appended claims.

DESCRIPTION OF INVENTION AND PREFERRED EMBODIMENTS

In accordance with the present invention, calcium tungstate is precipitated from a contaminated tungsten solution in a conventional manner, where the phosphate also precipitates as a calcium salt. The solids are separated from the solution and in the following are subjected in the manner as is usual for Scheelite ores with a pressure leaching employing soda ash solution similar to the process cited in Yih/Wang's book "Tungsten", New York 1979, page 88/90. Surprisingly, the tungstate nearly completely passes thereby into solution, whereas the phosphate for practical purposes does not pass at all into the solution. Thus, after separation of the residues from the solution a sodium tungstate solution is obtained practically free from phosphorus, which can be processed without additional purification steps to tungsten compounds with commercial qualities.

The present invention provides in particular the advantage that also tungsten raw materials with high contents in phosphorus can be processed economically and that the tungsten losses are lower than in the conventional processes. It is an additional advantage of the method of the present invention to obtain the phosphorus as a sufficiently tungsten poor slurry, which does not require a renewed processing for recovery of the tungsten present in it.

EXAMPLE 1

Just such an amount of calcium chloride solution was added to 10 m$^3$ of a technical sodium tungstate solution containing 51.7 g WO$_3$/l and 2.48 g P/l, that an excess of calcium can be found with ammonium oxalate. The solid resulting thereby is filtered off and is then treated in an autoclave at 20 bar pressure for four hours with 3 m$^3$ of a 20 weight percent soda ash solution. Then the solution and the solution residue were separated by filtration. After decomposition of the carbonate excess in the solution with hydrochloric acid, pure calcium tungstate was prepared in the manner described above, which was analyzed as follows:

WO$_3$—70.7 weight percent
P—below 0.03 weight percent

Such a calcium tungstate can serve as a raw material for the production of ammonium paratungstate by conventional processes having however less than about 0.001 weight percent phosphorus, or it can provide the raw material for the production of tool steels.

The tungsten losses in this example were as follows: 26 m$^3$ waste water from both precipitations contained

| 0.020 g WO$_3$/l | = 0.5 kg WO$_3$ |
|---|---|
| 605 kg (net dry) solution residue with 0.64 weight percent WO$_3$ and 4.1 weight percent P | = 4.0 kg WO$_3$ |
| total: | 4.5 kg WO$_3$, | which represents 0.7 weight percent of the starting amount of tungsten trioxide employed.

EXAMPLE 2

It was attempted to remove phosphorus from a heavily contaminated sodium tungstate solution according to the state of the art.

560 g Technically pure 33 weight percent magnesium chloride solution were added to 25 l of a sodium tungstate solution heated to 90° C. and having a pH value of 8.5 and a contents of 110 g WO$_3$/l and 0.46 g P/l. Then the solution was stirred for 29 hours at 90° C. and for an additional 10 hours under slow cooling to 30° C. Then the resulting precipitate was filtered off and washed with one liter of water.

The precipitate had a weight of 400 g after drying and contained 61.6 weight percent WO$_3$=246 g WO$_3$ and 2.55 weight percent P=10.2 g P. With reference to the starting solution 89 weight percent of the contents in phosphorus had precipitated, but also 9 weight percent of the contents in WO$_3$ had precipitated into the deposit.

Additional tests with solutions stronger in phosphorus indicated that with increasing contents in phosphorus the losses in tungsten continue to increase.

EXAMPLE 3

The test described in Example 1 was modified such that the pressure and the leaching time were varied in the pressure leaching of the impure calcium tungstate. Whereas under the conditions of Example 1 (4 hours, 20 bar) more than 99 percent of the WO$_3$ starting material passed into solution, these were only 47 percent after 4 hours at 5 bar and only 76 percent after 8 hours at 5 bar.

I claim:

1. A method for producing tungsten compounds low in phosphorus, which comprises:
   precipitating calcium tungstate from a tungstate solution containing phosphate impurities;
   converting the calcium tungstate by a pressure leaching with an alkali carbonate so as to produce an aqueous tungstate solution and a residue containing calcium phosphate and calcium carbonate; and
   recovering an alkali tungstate solution low in phosphorous.

2. The method for producing tungsten compounds according to claim 1, wherein the pressure leaching is performed at a pressure above 3 bar.

3. The method for producing tungsten compounds according to claim 2, wherein the pressure leaching is performed at a pressure from about 15 to 25 bar.

4. The method for producing tungsten compounds according to claim 1, wherein the alkali carbonate is employed in a greater than stochiometric amount.

5. The method for producing tungsten compounds according to claim 4, wherein the alkali carbonate is employed in an amount of from about 2 to 3 times the amount corresponding to a stochiometric ratio.

6. The method for producing tungsten compounds according to claim 1, wherein part of the alkali carbonate is replaced by a corresponding amount of alkali hydroxide.

7. The method for producing tungsten compounds according to claim 6, wherein from about 5 to 10 weight percent of the alkali carbonate is replaced by alkali hydroxide.

8. The method for producing tungsten compounds according to claim 1, wherein the concentration of the alkali carbonate solution employed in the pressure leaching is less than about 30 weight percent.

9. The method for producing tungsten compounds according to claim 1, wherein the alkali carbonate employed is sodium carbonate.

10. The method according to claim 1, wherein the calcium tungstate is precipitated from an aqueous alkali tungstate solution with calcium chloride.

* * * * *